March 22, 1966 L. E. HARLIN 3,241,332
AUTOMATIC DISCONNECT DEVICE FOR REFRIGERATION COMPRESSORS
Filed Oct. 26, 1964
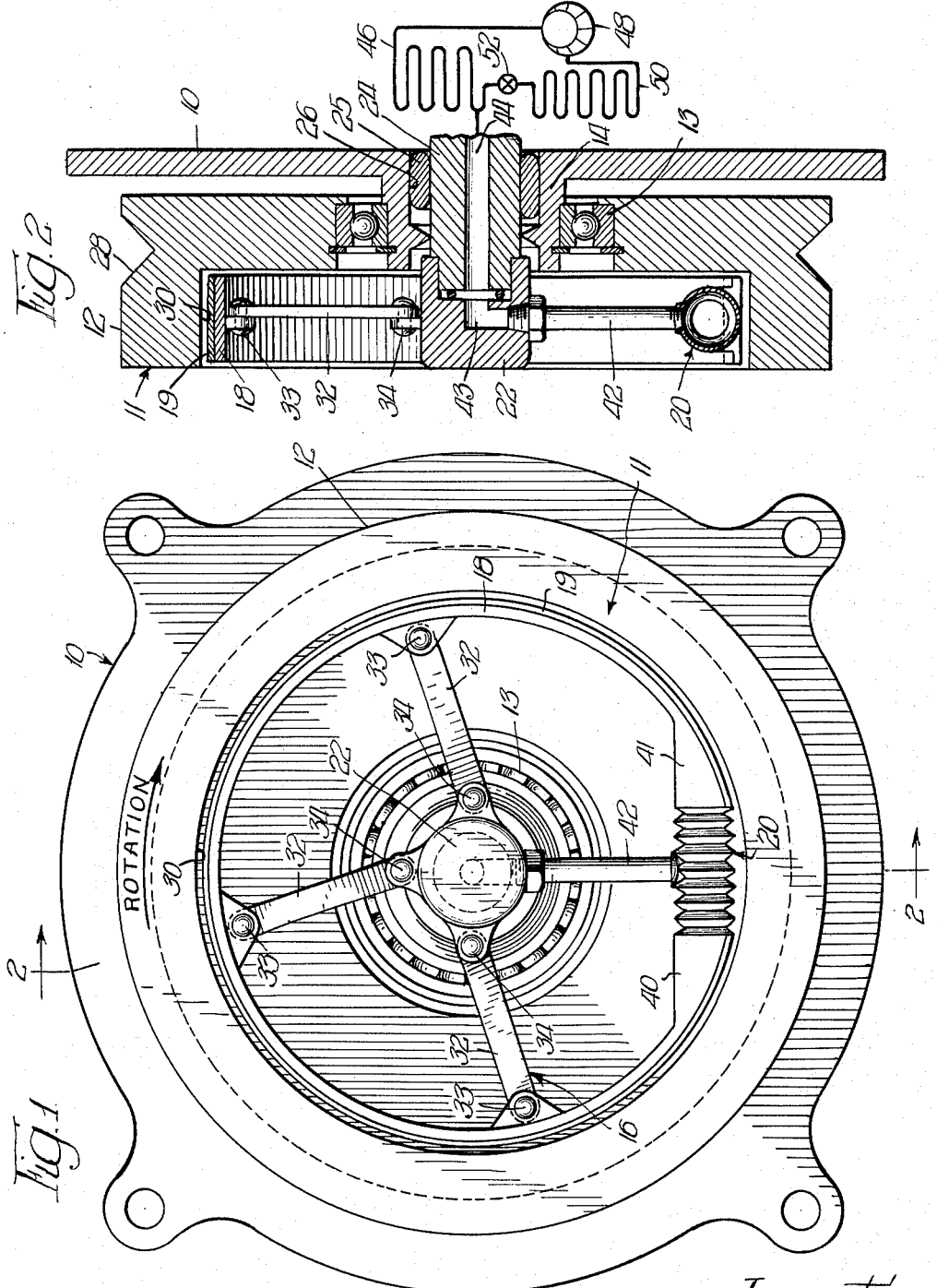
Inventor:
Lester E Harlin,
By Thomas B. Hunter
Atty.

United States Patent Office 3,241,332
Patented Mar. 22, 1966

3,241,332
AUTOMATIC DISCONNECT DEVICE FOR
REFRIGERATION COMPRESSORS
Lester E. Harlin, York, Pa., assignor to Borg-Warner
Corporation, a corporation of Illinois
Filed Oct. 26, 1964, Ser. No. 406,296
7 Claims. (Cl. 62—228)

This invention relates to automotive air-conditioning systems and more particularly to an automatic disconnect device incorporated in the compressor drive system.

In a conventional refrigeration system, particularly those of the type used in automotive installations, the compressor is driven intermittently to control evaporator temperature. Normally, this is accomplished by means of a clutch in the drive line, said drive line including a power take-off pulley driven by a V-belt connected to the automobile engine. In most instances, this clutch is of the magnetically actuated type which is controlled by means of a thermostat sensing the temperature of the evaporator coil or the air off the evaporator.

Under normal operating conditions, the clutch will cycle, i.e., stop and re-start the compressor every few seconds. Obviously, each time the compressor is stopped and started it puts the compressor under high torque loads which cause wear and may result in premature failure. Furthermore, the excessive noise which occurs when the compressor goes into operation is annoying to the driver. More recently, it has been proposed to use other types of refrigeration systems, such as for example, a rotary compressor in combination with a suction gas throttling system for controlling the capacity of the compressor. This type of compressor and capacity control system is described in copending application Serial No. 372,614, filed June 4, 1964. Since the capacity control mechanism takes care of variations in the cooling load, the compressor may run continuously during the cooling season without danger of failure. On the other hand, it has been found to be necessary to make certain the compressor does not run when the compressor outside ambient temperatures are too low. For example, the viscosity of the oil at temperatures below 20° F. is so high that severe damage could result if the compressor were inadvertently turned on. Under these conditions, the compressor lubricating oil has the consistency of heavy grease, and the resistance to torque applied could break the rotor vanes or drive shaft.

Ordinarily, the drive to the compressor would be disconnected at the same time the automobile is serviced for the winter. However, through ignorance or lack of attention, this is not always the case. The present invention obviates the necessity of insuring that the device is disconnected, thereby making the air-conditioning unit "idiot-proof."

It is therefore a principal object of the invention to provide a simple, inexpensive, disconnect device which will automatically prevent the compressor from being actuated when the ambient temperatures are below some predetermined value.

It is another object of the present invention to provide a disconnect device which is actuated by refrigeration system pressure rather than by the temperature within the engine compartment, thereby obtaining a more accurate indication of the ambient temperature and preventing operation of the compressor if the refrigerant charge is lost.

Additional objects and advantages will become apparent from a reading of the following detailed description taken in conjunction with the drawings wherein:

FIGURE 1 is a front plan view of a disconnect device constructed in accordance with the principles of the present invention; and FIGURE 2 is a cross-sectional view, partially schematic, taken along the plane of line 2—2 of FIGURE 1.

Referring now to the drawings, reference numeral 10 designates a bracket or frame for supporting a clutch assembly, denoted generally by numeral 11, through which drive is transmitted from the automobile engine to the compressor. Clutch assembly 11 comprises a torque input member taking the form of an annular pulley 12 supported by an anti-friction bearing 13 on the axially extending portion 14 of bracket 10, a torque output or driven member 16 including an expandable split ring element 18 actuated by servo element 20, and a hub 22 connected to the compressor drive shaft 24. The drive shaft 24, as shown in FIGURE 2, is journalled in bearing 25 received within a bore 26 in bracket 10.

The annular driving member 11 is provided with a groove 28 on its periphery for receiving a V-belt of the type ordinarily used to drive the generator and other auxiliary equipment. The central portion of the driving member 12 is provided with a counter bore 30 concentric with the axis of rotation which forms an annular friction surface engageable by the split ring element 18.

The split ring 18, having a conventional friction facing material 19 bonded to its outer surface, is connected to hub 22 by a plurality of links 32 pivotally attached to the split ring at circumferentially spaced points by means of pins 33. The other end of each link 32 is attached to the hub 22 by means of pins 34. It will be noted that links 32 are too long to pass through a dead-center position to permit the split ring to move to a position on the other side of an imaginary radial line connecting the axis of rotation to the pivot point on the hub. Consequently, if the driving member is rotated in the direction of rotation as indicated by the arrow in FIGURE 1, the gripping force on the split ring at its periphery will tend to rotate the split ring relative to the hub. In so doing, an outwardly directed radial force will increase the clutching action between the split ring and the driving member. On the other hand, if there is sufficient clearance between the friction facing on the split ring and the friction surface 30 on the driving member, the driving member can rotate freely with respect to the driven member and no torque will be transmitted to the drive shaft. It should be obvious from the foregoing description that once the split ring is brought into initial engagement with the driving member, the split ring is maintained in engagement due to the torque acting on the split ring to effect relative movement between the split ring and the hub. This produces an expansion force applied radially against the split ring through the links 32.

The means to bring the split ring into initial engagement with the driving member is preferably in the form of a pressure responsive servo element 20 which is operatively positioned between the two free ends of the split ring assembly. In a preferred embodiment, servo element 20 comprises a metal expansion bellows closed at both ends and engaging opposed portions 40, 41 of the split ring. The interior of the bellows is subjected to condenser pressure through a conduit 42 communicating with a passage 43 in the hub member 22 and a longitudinal passage 44 in the drive shaft 24. As shown schematically in FIGURE 2, the refrigeration system is interconnected with the passage 44 in the drive shaft, thereby communicating with the condenser coil 46. As is conventional with a typical refrigeration circuit, said circuit also includes a compressor 48, an evaporator 50 and a capillary or expansion valve 52. In actual practice, however, it may be convenient to utilize compressor oil pressure to actuate the clutch, which in the case of the compressor described in the aforementioned application Serial No. 372,614, is always at the refrigerant gas discharge (high side) pressure.

There are many advantages to using system pressure rather than some auxiliary temperature responsive device to control the clutch actuating servo. Most important is the fact that condenser pressure gives a truer indication of ambient temperature. The condenser, usually located in front of the radiator, receives a flow of ambient air which is substantially unaffected by the temperature of the air in the engine compartment. Consequently, the clutch is not likely to be falsely actuated by a rise in the engine compartment temperature. Another important consideration is the fact that the clutch cannot be actuated without a substantial change of refrigerant. In the conventional electromagnetic clutch, the drive is transmitted even though the system is dangerously low in refrigerant. It will be appreciated that in the present system, if the refrigerant charge is down, the actuating servo cannot bring the clutch into engagement.

OPERATION

In the event that outside ambient temperatures are below some predetermined value, such as 40° F. (this temperature not being critical), the air flow across the condenser will keep the pressure within the system so low that the pressure responsive servo element 20 will not bring the split ring into engagement with the drive pulley 12. Consequently, no torque is transmitted and the compressor will be inoperative. It will be understood that normally there will be some mass transfer of refrigerant under these conditions as vapor will always flow to the point having the lowest pressure, i.e. the condenser coil.

As the ambient temperature rises, the system pressure as applied to servo 20 will increase, and eventually the expansion of the servo bellows will bring the split ring into engagement with the drive pulley. Immediately thereafter, the resistance of the compressor to torque applied will cause a slight rotation of the split ring relative to the hub to produce a radially outwardly directed force on the split ring acting through links 32. After the compressor has been brought into operation, it will continue to be driven even if the ambient temperature should drop, just so long as the engine is not shut off. Obviously, if the engine is turned off while the ambient temperature is below the split ring retract point, the clutch will be disengaged.

While this invention has been described in connection with a certain specific embodiment thereof, it is to be understood that this is by way of illustration and not by way of limitation; and the scope of this invention is defined solely by the appended claims which should be construed as broadly as the prior art will permit.

What is claimed is:

1. In an automotive refrigeration system including a compressor, a condenser, and an evaporator connected to provide a refrigeration circuit, said compressor being adapted to be driven by the automobile engine, a disconnect device comprising a torque input member operatively connected to the engine; a torque output member operatively connected to said compressor; and means for clutching said input and output members together to provide a driving connection therebetween, said means being operative in response to refrigerant pressure.

2. In an automotive refrigeration system including a compressor, a condenser, and an evaporator connected to provide a refrigeration circuit, said compressor being adapted to be driven by the automobile engine, a disconnect device comprising a torque input member operatively connected to the engine; a torque output member operatively connected to said compressor; and means for clutching said input and output members together to provide a driving connection therebetween, said means being operative in response to refrigerant pressure as measured at said condenser.

3. In an automotive refrigeration system including a compressor, a condenser, and an evaporator connected to provide a refrigeration circuit, said compressor being adapted to be driven by the automobile engine, a disconnect device comprising a torque input member operatively connected to the engine; a torque output member operatively connected to said compressor; and clutch means for clutching said input and output members together to provide a driving connection therebetween, said clutch means being operative, after initial engagement to maintain its clutching action until torque is disapplied; and means operative in response to refrigerant pressure to produce initial engagement of said clutch means.

4. In an automotive refrigeration system including a compressor, a condenser, and an evaporator connected to provide a refrigeration circuit, power take-off means operatively associated with the automobile engine for driving said compressor, said means including a disconnect device operable to discontinue the drive from said automobile engine when the ambient temperature is below a predetermined value, said disconnect device comprising a torque input member, driven by said engine; a torque output member driving said compressor; means for clutching said input and output members together; and a servo element adapted to actuate said clutch means, said servo element being responsive to high side refrigerant pressure.

5. In an automotive refrigeration system including a compressor, a condenser, and an evaporator connected to provide a refrigeration circuit, and a drive train through which drive is transmitted from the automobile engine to said compressor, said drive train including a disconnect device operable to disengage the drive from said automobile engine when the ambient temperature is below a predetermined value, said disconnect device comprising a torque input member operatively connected to said automobile engine; a torque output member operatively connected to said compressor; clutch means for clutching said input and output members together; and a servo element adapted to initiate engagement of said clutch means, said servo element being responsive to refrigerant pressure.

6. In an automotive refrigeration system including a compressor, a condenser, and an evaporator connected to provide a refrigeration circuit, and a drive train through which drive is transmitted from the automobile engine to said compressor, said drive train including a disconnect device operable to disengage the drive from said automobile engine when the ambient temperature is below a predetermined value, said disconnect device comprising a torque input member operatively connected to said automobile engine; a torque output member operatively connected to said compressor; clutch means for clutching said input and output members together, said clutch means being operative, after initial engagement, to maintain its clutching action until torque is disapplied; and a servo element adapted to initiate engagerotation between said split ring and said hub causes a ment of said clutch means, said servo element being responsive to refrigerant pressure.

7. In an automotive refrigeration system including a compressor, a condenser, and an evaporator connected to provide a refrigeration circuit, a rotatable member driven by said engine, said member having an annular interior friction surface; a driven assembly connected to said compressor, said assembly comprising a split ring member having end portions movable toward and away from each other whereby said ring may be expanded to bring its surface into engagement with said annular friction surface, a hub connected to said compressor, a plurality of pivoted links each of which is connected at one end to said split ring member and at the other end to said hub, said links being arranged so that relative substantially radially directed force on said split ring to maintain it in engagement with said annular friction surface; an expandable servo element operatively positioned between the end portion of said split ring member, and means for supplying high side system refrigerant pressure to said servo element.

References Cited by the Examiner
UNITED STATES PATENTS

| | | | |
|---|---|---|---|
| 2,199,090 | 4/1940 | Palmer | 62—228 |
| 2,747,385 | 5/1956 | Jacobs | 62—228 |
| 2,918,805 | 12/1959 | Schjolin | 62—228 |
| 2,977,774 | 4/1961 | Ferris | 62—243 |
| 3,142,160 | 7/1964 | Hiyoshi | 62—243 |

WILLIAM J. WYE, *Primary Examiner.*